United States Patent [19]
Jensen

[11] 3,898,656
[45] Aug. 5, 1975

[54] RADAR DATA CONVERTER AND DISPLAY SYSTEM

[75] Inventor: Garold K. Jensen, Alexandria, Va.

[73] Assignee: The United States of America as represented by the Secretary of the Navy, Washington, D.C.

[22] Filed: June 27, 1967

[21] Appl. No.: 649,792

[52] U.S. Cl............................. 343/7.7; 343/9
[51] Int. Cl.² ................................. G01S 9/42
[58] Field of Search........................... 343/7.7, 9

[56] References Cited
UNITED STATES PATENTS
2,600,193  6/1952  Bell, Jr. et al. ................ 343/7.7
3,213,448  10/1965  Foley ............................ 343/9

Primary Examiner—T. H. Tubbesing
Attorney, Agent, or Firm—R. S. Sciascia; Arthur L. Branning

[57] ABSTRACT

A storage type phase-coherent pulse-doppler radar system wherein return signals containing doppler information from a plurality of ranges are stored and then analyzed to determine the velocity and acceleration of the targets. The resulting velocity, acceleration, range and time data are stored in a plurality of two-dimensional matrices with each of the four parameters being stored as a function of each of the other three parameters. The resulting two-dimensional data are then displayed on a plurality of cathode ray tubes.

14 Claims, 6 Drawing Figures

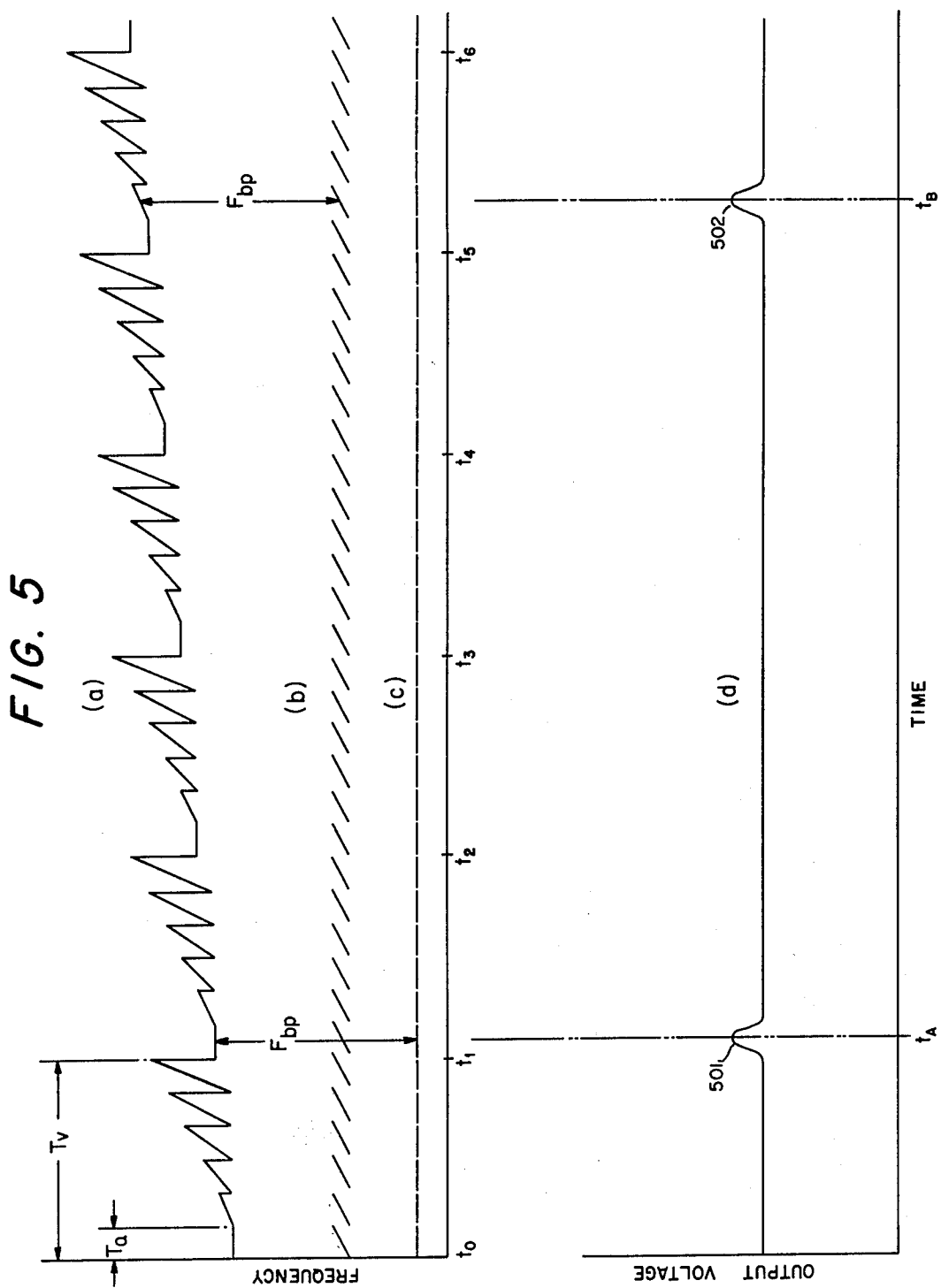

RADAR DATA CONVERTER AND DISPLAY SYSTEM

The invention described herein may be manufactured and used by or for the Government of the United States of America for governmental purposes without the payment of any royalties thereon or therefor.

BACKGROUND OF THE INVENTION

The present invention relates to a phase-coherent pulse-doppler radar system and more particularly to a system in which the analyzed return information is converted into a plurality of two-dimensional functions which are stored in a plurality of matrices.

Copending application Ser. No. 650,157 filed concurrently herewith by the present inventor discloses a radar system wherein a plurality of returned echoes resulting from a plurality of transmitted pulses are stored and then analyzed to determine the doppler frequency and the rate of change of the doppler frequency resulting from a moving and possibly accelerating target. Earlier systems displayed the data directly and a complete history of the targets' movements could not be displayed for visual interpretation.

The present application discloses a data converter and display system which converts the resulting target range, velocity, acceleration and time of occurrence data into a plurality of two-dimensional functions; i.e., range vs. velocity, range vs. acceleration, range vs. time, velocity vs. acceleration, velocity vs. time, and acceleration vs. time. These two-dimensional functions are stored and read out at any desired rate to be displayed on a plurality of two-dimensional display devices. Plural targets which may be indistinguishable on one or more of the display devices may be separately identified on some of the remaining displays. For example, two targets having the same range, velocity and times of occurrence but different accelerations would appear as two separate targets on the displays depicting acceleration even though they would be superimposed on the other displays. Likewise, plural similar targets occurring at slightly spaced time periods would be distinguishable on displays including time as a parameter even though they would merge on displays showing velocity vs. range, acceleration vs. range, and acceleration vs. velocity.

By being able to vary the rates of storage and readout independently, the signals being processed may be handled in a manner to allow the maximum integration, greatest resolution, the largest signal-to-noise ratio, and the extraction of the maximum information while displaying it to greatest advantage. Controlled storage or retention of the data (from a single write-in period to many minutes of storage) is possible and the independent readout is capable of high speeds to eliminate display flicker.

SUMMARY OF THE INVENTION

According to the present invention the stored return signals containing doppler information from each range interval are repeatedly mixed with a succession of locally generated known constant frequencies and known continuously varying frequencies so that whenever a proper match is obtained the unknown velocity or acceleration of the target can be determined. The results of these mixing operations are transmitted in parallel from each range channel to a plurality of storage matrices. Each of these storage matrices is a two-dimensional array of stationary storage elements and each matrix is scanned during write-in so that two-dimension plots of target parameters are obtained. Data on the target's range, velocity, acceleration, and time of occurrence are stored with these four parameters being plotted with all combinations of parameters taken two at a time, i.e., range vs. velocity, range vs. acceleration, range vs. time, velocity vs. acceleration, velocity vs. time, and acceleration vs. time.

Write-in strobe signals for the storage matrices are correlated with the succession of locally generated frequencies so that as the local oscillator is stepped through the expected doppler frequency spectrum, the write-in gates are successively opened. For example, in order to obtain the range vs. velocity write-in, the information signals in the plurality of range channels are fed in parallel to respective rows of the range vs. velocity storage matrix and only one storage element in each row is enabled to receive data at any given time. The other elements in each row are sequentially enabled in step with the velocity modulation steps in the spectrum compression and analysis system. During each velocity step the doppler signal in each range channel will be matched sequentially against a plurality of acceleration patterns and the succession of output voltages will be supplied to a storage element corresponding to that velocity step. The storage element will charge to the largest signal presented during that velocity step without integrating the successive voltages. Of course, this means that if multiple targets are present having identical range and velocity but different accelerations, only one will be revealed in the velocity vs. range storage matrix. This is the consequence of considering only two-dimensions of a four-dimensional space. These multiple targets are separately revealed by providing conversion to the other pairs of dimensions involving acceleration. In turn, the suppressed parameters in any two-dimensional display are revealed in the other displays.

Acceleration vs. range conversion is realized by feeding the outputs from the plural range channels in parallel to one side of a storage matrix and strobing the second side in unison with the acceleration modulation increments in the spectrum compressor. Conversion to acceleration vs. velocity is realized by linearly combining (above a selected threshold) the parallel range channel outputs into a single converter input so that a single succession of information signals is supplied to the matrix. The range information is no longer present but velocity and acceleration data are still available in the time positions of these signals. The storage converter on the write-in side is strobed in both the acceleration and the velocity dimensions and the information signals are distributed to the appropriate storage elements.

In order to have a complete history of the movement of a target it is desirable to store information concerning the time as well as the range, velocity, and acceleration of the target. This is accomplished by using time to control the strobe inputs to matrices in which target range, velocity and acceleration are stored as functions of time.

Readout of any of the data storage converters requires a strobe in each dimension and since readout is independently timed, it may proceed at a higher rate than the write-in. This readout rate may be selected to minimize or eliminate display flicker. The output signals from each matrix appear in sequential form and may thus be used to directly drive a CRT display. The storage converters supply the display sweep-synchronizing signals.

The final result is that all combinations of any two of the four parameters (range, velocity, acceleration, time) may be displayed with controlled target retention time. This controlled retention time allows target tracks to be generated, if desired, and the tracks will be a function of two parameters.

Sometimes there is a need for measuring signal amplitude. Such a measurement can readily be made by monitoring the storage converter outputs with an A-scope type of display. If it is desired to concentrate on a single signal, the automatic step scan of the velocity and acceleration modulations in the system can be switched to a manual mode of operation under the control of the observer.

The general purpose of this invention is to provide a radar data converter and display system which embraces all the advantages of prior art systems and possesses none of the aforedescribed disadvantages.

An object of the present invention is the provision of a radar system in which a plurality of target parameters are converted into a plurality of two parameter functions.

Another object is to provide a radar system in which the target's range, velocity, acceleration and time of occurrence are converted into a plurality of two-dimensional functions wherein a first parameter of the target is stored as a function of a second parameter of the target.

A further object of the invention is the provision of radar system in which plural targets can be distinguished whenever they differ in at least one of the parameters: range, velocity, acceleration, and time.

Still another object is to provide a radar system in which target data is stored as a plurality of two-dimensional functions and the retention time of the storage can be varied.

Yet another object of the present invention is the provision of a radar system in which the data concerning a target's range, velocity, and acceleration may continuously stored and retained as a function of time.

BRIEF DESCRIPTION OF THE DRAWING

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 5 shows time diagrams of signals appearing in the system.

DESCRIPTION OF THE PREFERRED EMBODIMENTS

Figure 1A:
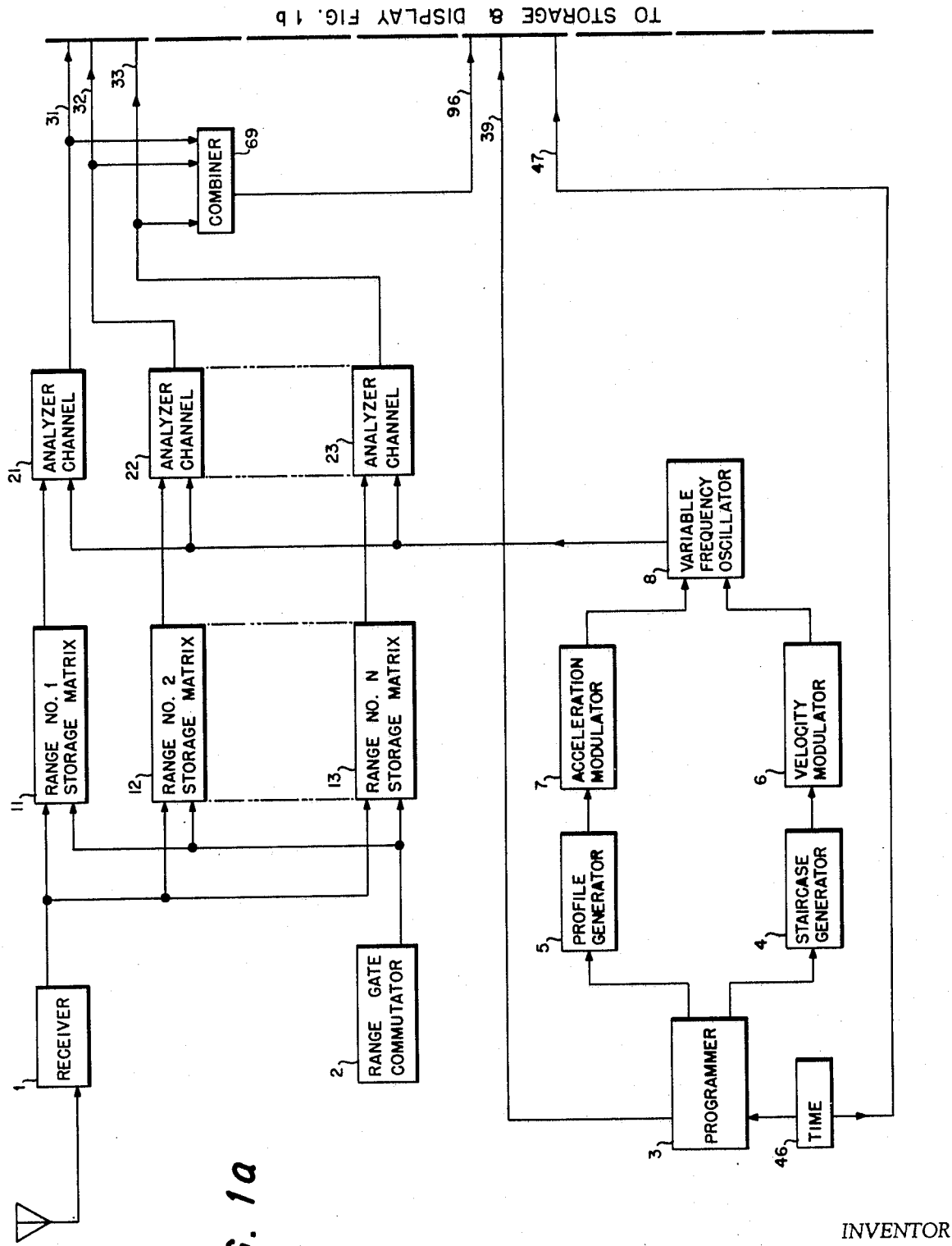
FIGS. 1a and 1b show a block diagram of a radar system embodying the present invention.
Figure 1B:
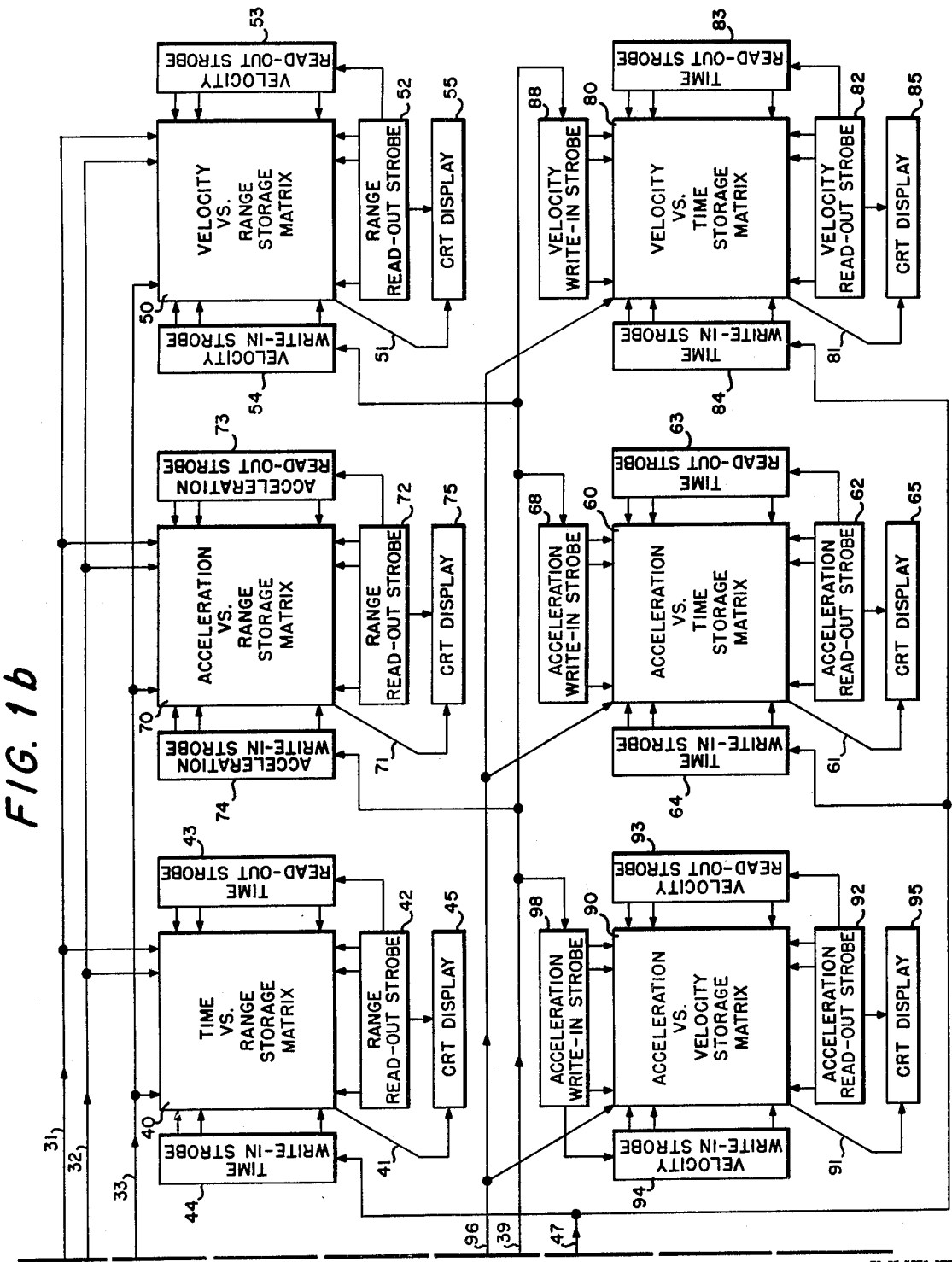

FIGS. 1a and 1b show a block diagram of a radar system incorporating the present invention. Receiver 1 is arranged to receive the successive echo signals resulting from a plurality of transmitted radar pulses. These echo signals may contain doppler information introduced by moving targets and it is this doppler information which is converted into useful target data according to the present invention. As explained in detail in copending application Ser. No. 649,791 filed concurrently herewith by the present inventor, the returned signal from each transmitted pulse is mixed with one or more coherent local frequencies to produce a beat frequency corresponding to the doppler shift introduced by a moving target. Since the transmitted radar pulses are relatively short when compared with a cycle of doppler frequency, it is necessary to mix the local frequency with a succession of returned signals and to maintain the local frequency coherent in phase with respect to the originally transmitted frequency. The output of the mixing process is filtered to obtain a series of bipolar video pulses whose amplitude envelope contains the doppler information. This bipolar video signal is sampled at a plurality of intervals corresponding to range gates and distributed by range gate commutator 2 to the appropriate range gate storage units 11, 12, 13, etc. (only three units are illustrated but it is obvious that many more units could be included if desired.) Each of these storage units may be a plurality of capacitors which are successively gated so that a given storage unit will store a plurality of sequential video signals corresponding to a given range gate. When the capacitors for a given range gate are read out in rapid succession the amplitude envelope of the resulting signals will contain the doppler frequency multiplied by the ratio of the write-in time over the readout time. This multiplied doppler frequency will be constant if the target is moving at a constant radial velocity, but it will vary if the radial velocity varies.

In order to analyze the doppler frequencies stored in the various range gate storage units 11, 12, 13, etc. a plurality of analyzer channels 21, 22, 23, etc. are used. These analyzer channels are more fully described in the copending application Ser. No. 650,157 filed concurrently herewith by the present inventor. Each analyzer channel contains a mixer in which the multiplied doppler signal read out of the corresponding range gate storage unit is heterodyned with a signal produced by variable frequency oscillator 8. This oscillator is controlled by velocity modulator 6 and acceleration modulator 7 so that it systematically produces a series of constant and continuously variable frequencies which correspond to the expected multiplied doppler frequencies caused by the targets being detected. Staircase generator 4 in conjunction with velocity modulator 6 causes the frequency of oscillator 8 to step through a sequence of constant frequencies which are then mixed with the unknown doppler signals. This mixing occurs in analyzing channels 21, 22, 23, etc. and each of these channels contains a band pass filter which passes a signal only when the difference frequency lies within the pass band of the filter.

Programmer 3 is arranged to emit trigger pulses to start the sweeps of profile generator 5 and to cause the stepping of staircase generator 4. The profile generator may be a sawtooth generator if the target's acceleration pattern is expected to be substantially linear over the frequency matching period but non-linear profiles may be used if necessary.

The frequency analyzing operation can be better understood with reference to FIG. 5 where signal (a) shows the frequency of the signal being emitted by variable frequency oscillator 8 and signals (b) and (c) represent the multiplied doppler frequency signals present in the output of one of the range gate storage units such as storage unit 11 in FIG. 1a. Signals (b) and (c) could result from two targets having the same range but different velocities and accelerations. As shown, signal (c) would represent a constant velocity target while signal (b) would represent a higher velocity target having a constant radial acceleration. To simplify the explanation only six velocity gates and six acceleration gates are illustrated in FIG. 5a and only increasing frequency profiles are shown. If both accelerating and decelerating targets were expected, decreasing frequency sweeps would be included. The period $T_a$ is the time for one complete memory readout and during each $T_a$ seconds the stored signal is compared in frequency with a different local frequency to determine if the difference frequency will pass through the narrow band pass filter in the analyzer channel. Thus, in the time between $t_0$ and $t_1$ in FIG. 5 the range gate storage unit is read out six times and six sequential frequency comparisons are made. First the target signal is compared with a constant frequency signal and then it is successively compared with linearly increasing frequencies whose rates of change are stepwise increased. At time $t_1$ the inspection of the first velocity gate has been completed and the inspection of the next higher velocity gate is about to begin. This is accomplished in the same manner as before except all the locally generated frequencies are now shifted upward by a constant amount.

Target signals (b) and (c) are obtained by repeatedly reading out the contents of one range gate memory unit and it can be seen that they differ from signal (a) by a certain frequency $F_{bp}$ at certain times during the comparison sequence. If it is assumed that $F_{bp}$ is the frequency which passes through the narrow band pass filter while other difference frequencies are rejected by this filter, the output signal from the analyzer channel will be as shown in FIG. 5d. The time positions of the two output pulses 501, 502 indicate in which velocity gates and in which acceleration gates the two targets occur.

Output signals such as the one shown in FIG. 5d appear on lines 31, 32, 33, etc. in FIG. 1a and these signals in conjunction with time signals on line 47 contain all the information necessary for conversion to two-dimensional plots of range vs. time, velocity vs. range, acceleration vs. time, acceleration vs. range, velocity vs. time, and acceleration vs. velocity.

The velocity vs. range plot is obtained by supplying the analyzer channel outputs in parallel over lines 31, 32, 33, etc. to velocity vs. range storage matrix 50 and using velocity write-in strobe 54 to sequentially gate the rows of storage elements in matrix 50. A more complete understanding of this storage operation can be obtained by referring to FIG. 2 which shows a more detailed diagram of storage matrix 50 and its associated strobe circuits.

Figure 4:
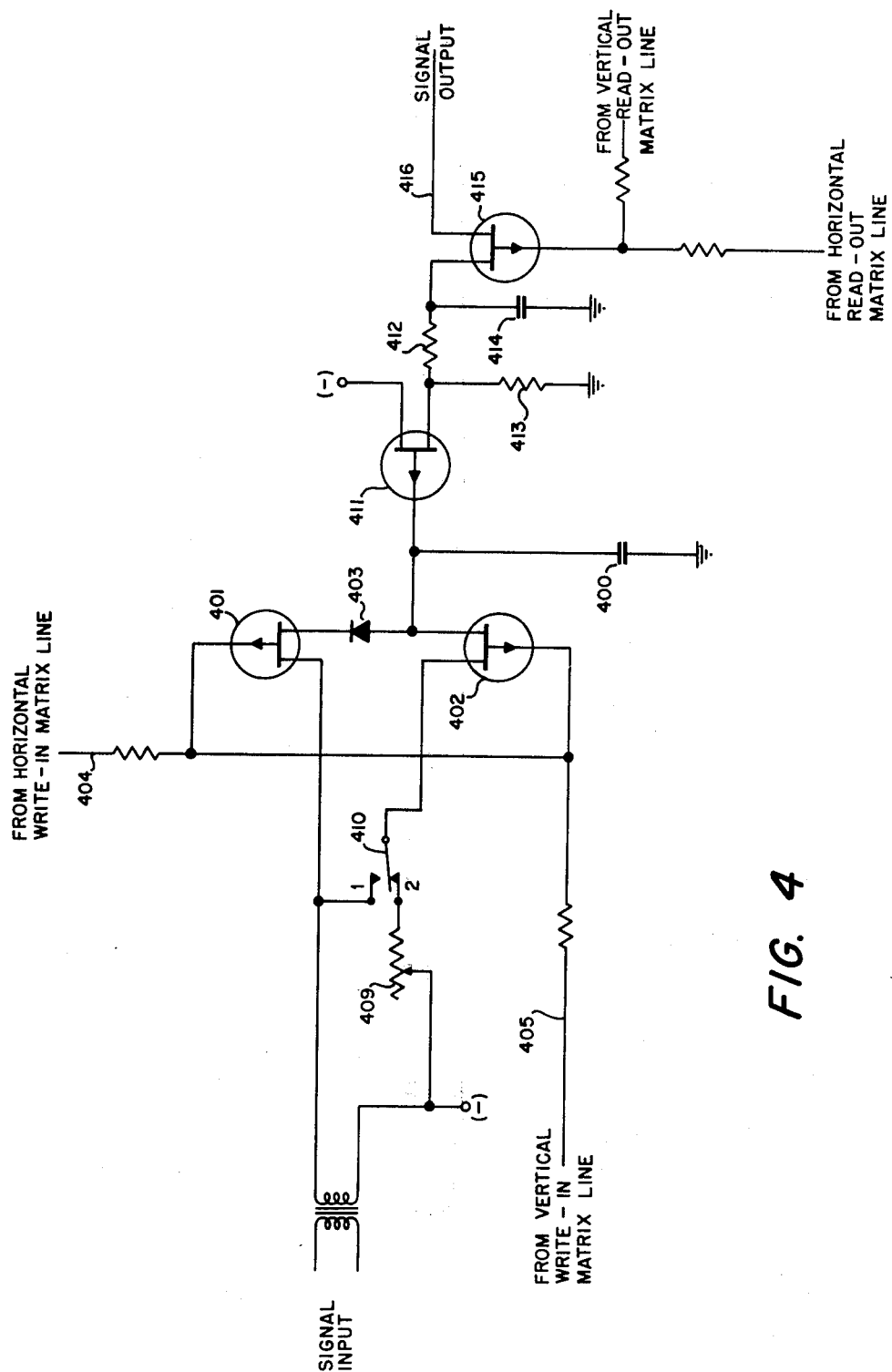
FIG. 4 shows a typical storage element with means to vary the retention time.

Signals such as that shown in FIG. 5d appear on lines 31, 32, etc. which carry signals for the respective range intervals. For example, FIG. 5d may represent a signal on line 31 which means that target signals 501 and 502 represent targets found in range gate No. 1. The signals from the various range gates are applied in parallel on lines 31, 32, etc. to the corresponding columns of storage matrix 50 and gating signals from velocity write-in strobe 54 distribute these signals to the proper matrix rows. Write-in strobe circuit 54 may include a ring counter which receives the velocity step trigger pulses from programmer 3 and energizes lines 231, 232, etc. in sequence in unison with the stepping of staircase generator 4. Lines 231, 232, etc. control gates 211, 212, 213, 214, etc. so these gates pass the signals on lines 31, 32, etc. to the appropriate storage device 201, 202, 203, 204, etc. A typical storage device is shown in FIG. 4 where capacitor 400 is the actual element which stores the information signals. FIG. 4 shows a device where gating signals must appear simultaneously on lines 404 and 405 before gate 401 will open to pass the signal input to capacitor 400. However, in the velocity vs. range matrix of FIG. 2 only one gating input for each storage device is used and the vertical write-in matrix line 405 would be eliminated so that the circuit in FIG. 4 could be used as gate 211 and store 201 in FIG. 2. The information signal input such as that shown in FIG. 5d would appear on line 31 and the gating signal would occur at appropriate times on line 231. Store 201 is arranged to store target signals which occur in the first range gate and the first velocity gate. More than one target may have this range and velocity but this fact would not be indicated in store 201 because while gate 211 for this store is open, the storage element is charged to the largest amplitude of a number of signal inputs and multiple targets do not affect this largest amplitude. FIG. 4 shows how this storage is brought about. Transistor gate 401 has the capability of charging storage element 400 to the highest input signal level as long as gate pulses are present but, due to the presence of diode 403, it cannot reduce the charge to the lower level of a subsequent input signal. With switch 410 in position 1 transistor 402 permits the charge on capacitor 400 to be reduced as well as raised to the level of the input signal in situations where it is not necessary to pick out the largest signal for storage. Controlled erasing with a variable retention time is obtained by placing switch 410 in position 2 and allowing variable resistor 409 to control the retention time. Only one common switch 410 is required to supply the signal to a plurality of storage devices.

Figure 2:
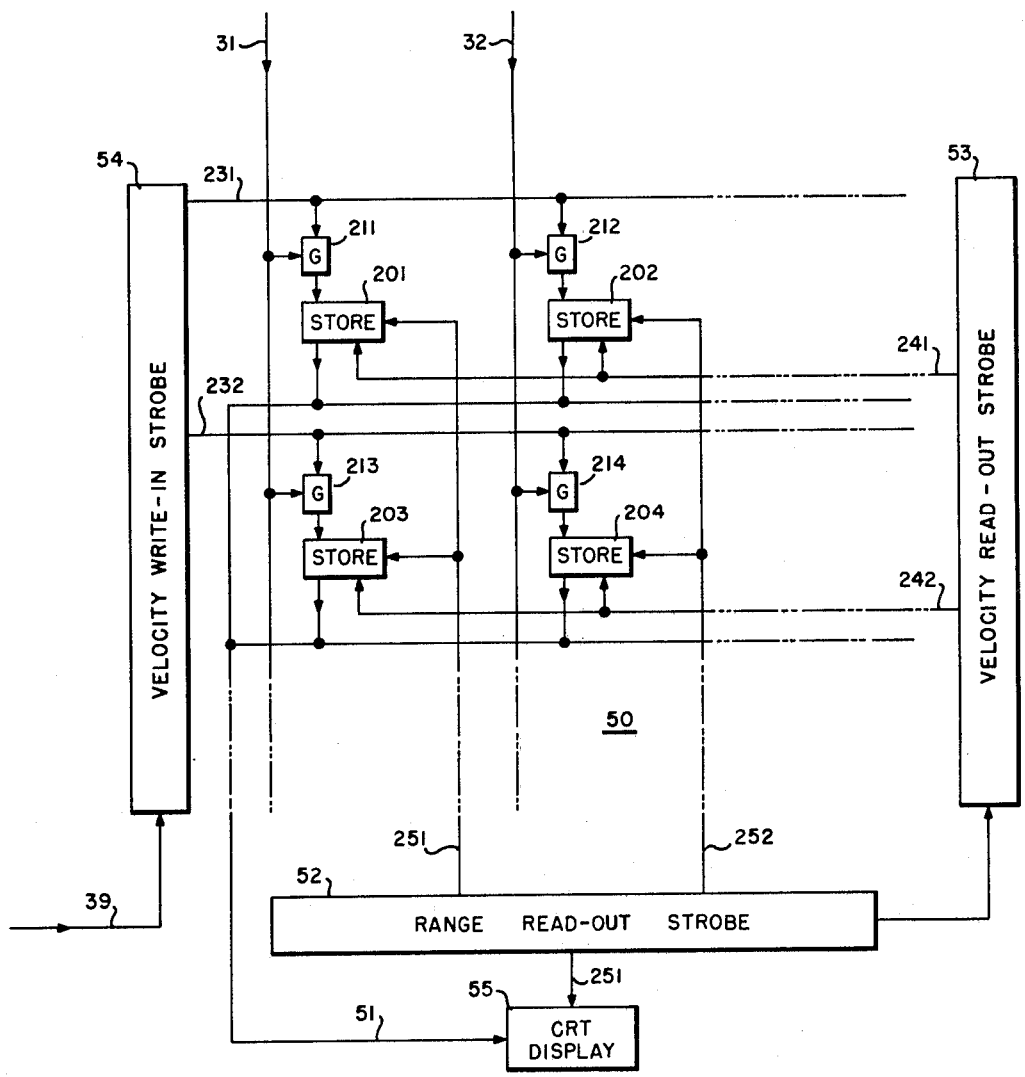
FIG. 2 shows a storage matrix and CRT display for storing and displaying target range vs. velocity data.

In order to store the signal of FIG. 5d in the velocity vs. range matrix of FIG. 2, this signal is supplied on line 31 and gate 211 is opened during the time from $t_0$ to $t_1$ then gate 213 is opened from $t_1$ to $t_2$ and the remaining gates in the column are likewise opened in turn. As shown, target signal 501 would be stored in the second storage device (i.e., store 203) in the first column of matrix 50 and signal 502 would be stored in the sixth storage device in the same column.

The readout of the information in matrix 50 may be completely independent of the write-in. Readout strobes 52 and 53 in FIG. 2 may include ring counters which step at rates entirely different from that of write-in strobe 54. Strobe 52 may include a pulse generator which supplies stepping pulses for strobing the matrix as well as sweeping the CRT screen in display 55. The readout rate may be selected to minimize or eliminate display flicker without changing the write-in rate.

FIG. 4 shows how the readout of one storage element takes place. The capacitance of the output circuit, when switched to storage element 400 and charged to the level of the stored charge would nibble away a small portion on each readout. To prevent this action field-effect transistor 411 is shown with dc input connection to provide isolation, very high input resistance, and low output resistance. The current flow in the circuit including resistor 413 is controlled by the voltage appearing on capacitor 400, whereby after a period of time determined by resistor 412 and capacitor 414 a voltage proportional to that appearing on capacitor 400 will appear on capacitor 414. Transistor gate 415 is opened by simultaneously supplying gating signals to the vertical and horizontal readout matrix lines so that the stored signal appearing on capacitor 414 is read out on line 416.

All of the readout signals from a given matrix are placed on a single line such as line 51 in FIG. 2 and used to control the intensity of the beam in the CRT display. Thus, the position of the CRT beam depends upon the positions of readout strobes such as 52, 53 while the intensity of the beam depends upon the presence or absence of target signals. The position of a target spot on the cathode ray screen of display 55 indicates the range and velocity of the corresponding target.

Figure 3:
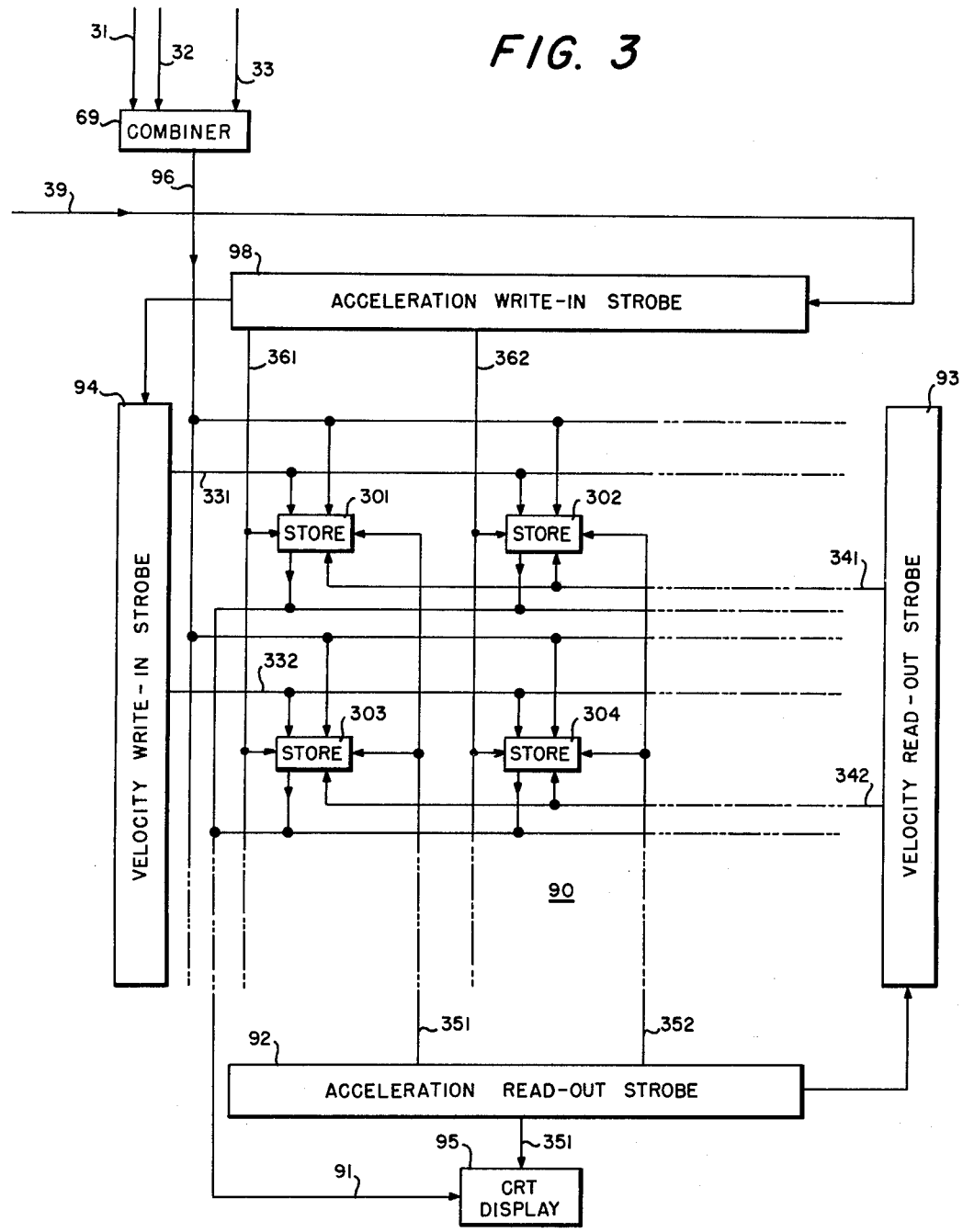
FIG. 3 shows a storage matrix and CRT display for storing and displaying target velocity vs. acceleration data.

FIG. 3 shows a storage matrix 90 for storing information concerning the velocity and acceleration of the targets. In this matrix, range information is not being used so all of the signals from the parallel range channels on lines 31, 32, 33, etc. are combined into a single sequence of signals to be supplied to matrix 90. The combining operation is carried out by combiner 69 which linearly adds the signals on lines 31, 32, 33 etc. and transmits the combined signals on line 96. Only signals above a selected threshold on the input lines are added. After this addition the signals on line 96 represent all targets regardless of range and they are presented simultaneously to all the storage devices 301, 302, 303, 304, etc. These storage devices may be similar to that shown in FIG. 4 and both horizontal and vertical gating signals are needed to permit the signal to be stored. These write-in gating signals are supplied by strobe circuits 94 on lines 331, 332 etc. and 98 on lines 361, 362 etc. which may include ring counting circuits under the control of programmer 3. The readout of this matrix is similar to that of all the other storage matrices. The sweep circuits for CRT display 95 are coordinated with readout strobe circuits 92, 93 and the beam intensity is controlled by the matrix output signal on line 91.

In order to display history of the target motion it is desirable to have plots of target range, velocity, and acceleration versus time. Time generator 46 emits equally spaced pulses on line 47 which are synchronized with a complete analysis cycle, that is a cycle in which all velocity gates and all acceleration gates are inspected. Such a complete cycle of analysis is illustrated in FIG. 5 where a signal diagram for a simplified system with six velocity gates and six acceleration gates is illustrated. Time generator 46 causes time write-in strobe circuits to step once after each complete velocity and acceleration analysis cycle. For example, referring to storage matrix 40 in FIG. 1b the signals from the various range channels are applied in parallel to the vertical lines of the write-in portion of the matrix and time generator 46 causes write-in strobe 44 to step once after each inspection of all the velocity and acceleration gates. If one of the range gates includes two targets such as those represented by signals 501 and 502 in FIG. 5d the particular storage capacitor in matrix 40 receiving these signals would be charged to the level of the highest signal and the matrix would merely retain the fact that at least one target was present at the given range at that time. These targets would not be indicated separately on the range vs. time display.

The operation of the other storage matrices 60, 70, 80 are similar to that for the matrices described above. In each case the acceleration write-in strobes 68, 74, 98 step in unison with the sweeps of acceleration modulator 7, while the velocity write-in strobes 54, 88, 94 step with velocity modulator 6, and the time write-in strobes 44, 64, 84 step with the signals from time generator 46. The readout can be quite similar for all six matrices. The stepping of the readout strobes is correlated with the horizontal and vertical sweeps of the CRT displays and the signals read out from the storage matrices are used to control the CRT beam intensities. The ultimate result is six two-dimensional displays with three of these displays showing target tracks with range, velocity, and acceleration plotted as a function of time.

In conclusion, therefore, there has been disclosed a system for converting moving target radar data into a plurality of displays wherein multiple targets can be distinguished due to differences in one or more aspects of the target's motion.

Various modifications are contemplated and may obviously be resorted to by those skilled in the art without departing from the spirit and scope of the invention, as hereinafter defined by the appended claims, as only a preferred embodiment thereof has been disclosed. Application Ser. No. 649,794 filed concurrently herewith by Garold K. Jensen and James E. McGeogh discloses an alternative system using panels of neon lamps for displaying the desired information.

What is claimed and desired to be secured by Letters Patent of the United States is:

1. In a moving target detecting apparatus, a system for analyzing and converting signals containing information about a plurality of target parameters, said system comprising:
 a plurality of storage means for separately storing doppler information signals from a plurality of range intervals;
 a plurality of analyzing channels, one for each said range interval, for analyzing the stored doppler information signals when they are read out of said storage means;
 a plurality of two-dimensional storage matrices for receiving the outputs of said analyzing channels and converting said outputs into a plurality of two-dimensional storage plots with each said target parameter plotted as a function of each of the other target parameters;
 a time generator to produce regularly spaced pulses indicative of time; and
 means to couple said regularly spaced pulses to at least one of said storage matrices to record at least one of said target parameters as a function of time.

2. The system of claim 1 wherein each of the two-dimensional storage matrices comprises a plurality of capacitors.

3. The system of claim 2 wherein each of the two-dimensional storage matrices includes gating means for selectively gating input signals to said capacitors.

4. The system of claim 3 wherein at least some of said gating means include unilateral devices to permit the corresponding capacitors to charge to the maximum signals presented thereto.

5. A phase-coherent pulse-doppler radar system comprising:
   means to produce on a plurality of lines, one for each of a like plurality of range intervals, frequency signals whose frequencies vary with the doppler frequencies produced by targets in the corresponding range intervals;
   analyzing means comprising a plurality of analyzing channels connected individually to respective ones of said lines to receive said frequency signals;
   a variable frequency generating means for producing a repeated sequence of fixed and smoothly varying frequencies;
   programming means connected to said variable frequency generating means to regularly step said variable frequency through said sequence of fixed and varying frequencies;
   means connecting the output of said variable frequency generating means in parallel to each of said analyzing channels;
   means connecting the outputs of said analyzing channels in parallel to a plurality of storage matrices each comprising a two-dimensional array of storage elements; and
   strobing means for each of said storage matrices connected to said programming means for gating the output signals of said analyzing channels into said storage elements.

6. The system of claim 5 wherein said variable frequency generating means includes an acceleration profile generator which under control of said programming means is stepped to cause the variable frequency to be varied sequentially at a plurality of predetermined different rates.

7. The system of claim 6 wherein at least one of said strobing means is stepped in unison with the stepping of said acceleration profile generator.

8. The system of claim 6 wherein at least one of said strobing means is stepped in unison with the stepping of said staircase generator.

9. The system of claim 5 including:
   a time generator which supplies regularly spaced stepping pulses to at least one of said strobing means so that the two-dimensional array of storage elements in at least one of said storage matrices is gated as a function of time.

10. The system of claim 5 wherein each storage element is a capacitor.

11. The system of claim 6 wherein said variable frequency generating means includes a staircase generator which under the control of said programming means is stepped to cause the variable frequency to shift in a stepwise manner.

12. A radar signal converter system comprising:
   means to separate signals containing doppler information according to the range intervals from which the signals were derived;
   frequency generating means to stepwise produce a sequence of fixed and varying known frequencies;
   one analyzing means for each range interval to accept said doppler information signals for that range interval and said sequence of fixed and varying known frequencies to produce a pulse signal whenever the frequency difference between the doppler information signal and the known frequency is within a predetermined band;
   means connecting the outputs of said analyzing means in parallel to a plurality of two-dimensional storage matrices;
   gating means associated with each said storage matrix to sequentially gate said pulse signals to plural storage elements in said storage matrix; and
   write-in strobing means associated with each said storage matrix acting in unison with the stepping of the frequency generating means to sequentially contrl said gating means.

13. The system of claim 12 including:
   readout strobing means associated with each said storage matrix to sequentially control the readout of the information stored in said storage matrix.

14. The system of claim 13 including:
   a cathode ray tube associated with each said storage matrix to display the information read out of said storage matrix.

* * * * *